United States Patent
Berdichevsky et al.

(10) Patent No.: US 9,695,937 B2
(45) Date of Patent: *Jul. 4, 2017

(54) ENERGY SAVING SEAL WITH VACUUM INDUCED COUNTER-BALANCE AND ROCKING FEATURE

(71) Applicant: Freudenberg-NOK General Partnership, Plymouth, MI (US)

(72) Inventors: Alexander Berdichevsky, Farmington Hills, MI (US); Muhammad Mujahid Azni, Kuala Lumpur (MY)

(73) Assignee: Freudenberg-NOK General Partnership, Plymouth, MI (US)

(*) Notice: Subject to any disclaimer, the term of this patent is extended or adjusted under 35 U.S.C. 154(b) by 261 days.

This patent is subject to a terminal disclaimer.

(21) Appl. No.: 14/172,329

(22) Filed: Feb. 4, 2014

(65) Prior Publication Data

US 2015/0219218 A1 Aug. 6, 2015

(51) Int. Cl.
  *F16J 15/16* (2006.01)
  *F16J 15/3224* (2016.01)
(52) U.S. Cl.
  CPC ......... *F16J 15/164* (2013.01); *F16J 15/3224* (2013.01)
(58) Field of Classification Search
  CPC .................................................. F16J 15/3244
  See application file for complete search history.

(56) References Cited

U.S. PATENT DOCUMENTS

| | | | |
|---|---|---|---|
| 2,482,029 A | 9/1949 | Reynolds |
| 2,635,907 A | 4/1953 | Heimbuch |
| 2,697,623 A | 12/1954 | Mosher |
| 2,731,284 A | 1/1956 | Chambers, Jr. et al. |
| 2,736,583 A | 2/1956 | Marvin |
| 2,736,585 A | 2/1956 | Riesing |
| 2,736,586 A | 2/1956 | Riesing |
| 2,743,950 A | 5/1956 | Helfrecht et al. |
| 2,758,853 A | 8/1956 | Beck |
| 2,797,944 A | 7/1957 | Riesing |
| 3,005,648 A | 10/1961 | Christensen |
| 3,049,356 A | 8/1962 | Talamonti |
| 3,356,376 A | 12/1967 | Bradfute et al. |
| 3,477,730 A | 11/1969 | Kare et al. |
| 3,554,566 A | 1/1971 | Bechtrold et al. |
| 3,572,734 A | 3/1971 | Holt |
| 3,612,546 A | 10/1971 | Otto et al. |
| 3,623,738 A | 11/1971 | MacDonnell |

(Continued)

*Primary Examiner* — Vishal Patel
(74) *Attorney, Agent, or Firm* — Daniel J. Sepanik, Esq.; Harness, Dickey & Pierce, P.L.C.

(57) ABSTRACT

A seal includes an annular mounting portion having a bellows portion extending axially and radially inward from the mounting portion. An axial leg extends axially from the bellows portion. A lay down sealing lip extends radially inward and axially from an end of the axial leg. A dust lip extends from the end of the axial leg in a direction opposite the lay down sealing lip. When the oil side is under negative pressure and when the lay down sealing lip begins to lift radially off the shaft there is a counterbalance force applied to the axial leg through the bellows geometry which maintains the lay down sealing lip in contact with the shaft. In addition, the seal is designed to be flexible enough that the oil side vacuum "rocks" the seal bringing the dust lip into contact with the shaft and blocking airflow.

2 Claims, 1 Drawing Sheet

(56) References Cited

U.S. PATENT DOCUMENTS

Figure 1:
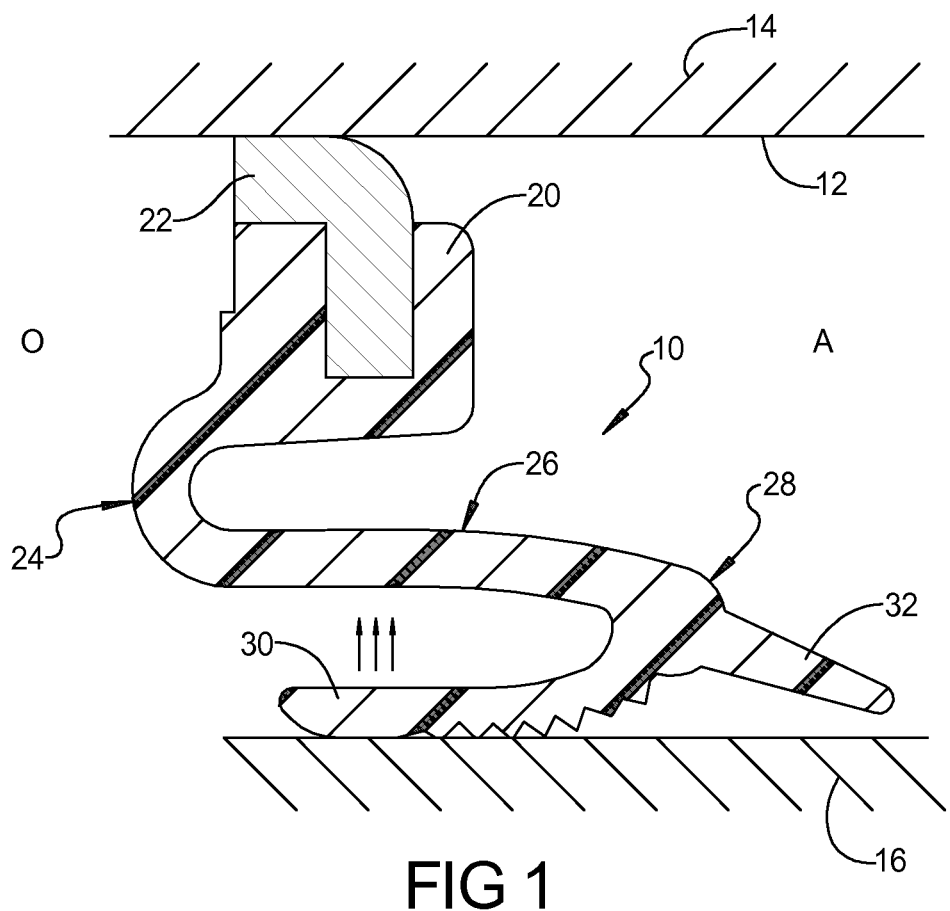

| Patent No. | Date | Inventor |
|---|---|---|
| 3,785,660 A | 1/1974 | Bush |
| 3,822,890 A | 7/1974 | Bourgeois |
| 3,827,703 A | 8/1974 | Brink |
| 3,921,987 A | 11/1975 | Johnston |
| 3,921,990 A | 11/1975 | Johnston |
| 3,941,396 A | 3/1976 | Bailey et al. |
| 4,021,049 A | 5/1977 | Phelps et al. |
| 4,037,849 A | 7/1977 | Thumm |
| 4,102,538 A | 7/1978 | Bertin |
| 4,106,781 A | 8/1978 | Benjamin et al. |
| 4,126,320 A | 11/1978 | Pendleton |
| 4,132,421 A | 1/1979 | Corsi et al. |
| 4,190,258 A | 2/1980 | Arai et al. |
| 4,208,060 A | 6/1980 | St. Laurent, Jr. |
| 4,226,428 A | 10/1980 | Paptzun |
| 4,229,010 A | 10/1980 | St. Laurent, Jr. |
| 4,270,762 A | 6/1981 | Johnston |
| 4,274,641 A * | 6/1981 | Cather, Jr. ............ F16J 15/322 277/309 |
| 4,300,778 A | 11/1981 | Gagne |
| 4,344,631 A | 8/1982 | Winn |
| 4,348,031 A | 9/1982 | Johnston |
| 4,360,208 A | 11/1982 | Hill et al. |
| 4,413,829 A | 11/1983 | Pietsch |
| 4,449,717 A | 5/1984 | Kitawaki et al. |
| 4,474,484 A | 10/1984 | MacInnes et al. |
| 4,519,616 A | 5/1985 | Johnston |
| 4,531,747 A | 7/1985 | Miura et al. |
| 4,531,748 A | 7/1985 | Jackowski |
| 4,550,920 A | 11/1985 | Matsushima |
| 4,553,763 A | 11/1985 | Ehrmann |
| 4,585,236 A | 4/1986 | Simmons et al. |
| 4,588,195 A | 5/1986 | Antonini et al. |
| 4,611,931 A | 9/1986 | Brandenstein et al. |
| 4,630,834 A | 12/1986 | Muller et al. |
| 4,635,947 A | 1/1987 | Hatayama |
| 4,643,436 A | 2/1987 | Jackowski |
| 4,650,196 A | 3/1987 | Bucher et al. |
| 4,750,748 A | 6/1988 | Visser |
| 4,805,919 A | 2/1989 | Wiblyi et al. |
| 4,815,749 A | 3/1989 | Johnston |
| 4,844,484 A * | 7/1989 | Antonini ............... F16J 15/3224 277/561 |
| 4,940,248 A | 7/1990 | Kilthau et al. |
| 4,986,553 A | 1/1991 | Preston et al. |
| 4,995,621 A | 2/1991 | Devouassoux et al. |
| 5,004,248 A | 4/1991 | Messenger et al. |
| 5,085,444 A | 2/1992 | Murakami et al. |
| 5,137,285 A | 8/1992 | Pick |
| 5,139,275 A * | 8/1992 | Ehrmann ............. F16J 15/3244 277/559 |
| 5,167,419 A | 12/1992 | Robertson |
| 5,183,269 A | 2/1993 | Black et al. |
| 5,190,299 A | 3/1993 | Johnston |
| 5,201,528 A | 4/1993 | Upper |
| 5,244,215 A | 9/1993 | Cather, Jr. et al. |
| 5,292,199 A | 3/1994 | Hosbach et al. |
| 5,348,312 A | 9/1994 | Johnston |
| 5,348,313 A | 9/1994 | Pawlakowitsch et al. |
| 5,370,404 A | 12/1994 | Klein et al. |
| 5,398,942 A | 3/1995 | Duckwall et al. |
| 5,427,387 A | 6/1995 | Johnston |
| 5,462,287 A | 10/1995 | Hering et al. |
| 5,462,288 A | 10/1995 | Hering et al. |
| 5,476,270 A | 12/1995 | vom Schwemm et al. |
| 5,501,469 A | 3/1996 | Ducugnon et al. |
| 5,509,667 A | 4/1996 | Klein et al. |
| 5,556,112 A | 9/1996 | Brandt |
| 5,624,290 A | 4/1997 | Von Bergen et al. |
| 5,668,426 A | 9/1997 | Lamert et al. |
| 5,692,757 A | 12/1997 | Straub |
| 5,711,534 A | 1/1998 | Bengoa et al. |
| 5,791,658 A | 8/1998 | Johnston |
| 5,842,828 A | 12/1998 | Ozawa et al. |
| 5,909,880 A | 6/1999 | Waskiewicz |
| 5,921,555 A | 7/1999 | Johnston |
| 5,957,461 A | 9/1999 | Ulrich |
| 5,967,527 A | 10/1999 | Fabro et al. |
| 6,019,229 A | 2/2000 | Rao |
| 6,279,914 B1 | 8/2001 | Yamanaka et al. |
| 6,298,955 B1 | 10/2001 | Frost |
| 6,336,638 B1 | 1/2002 | Guth et al. |
| 6,357,757 B1 | 3/2002 | Hibbler et al. |
| 6,409,177 B1 | 6/2002 | Johnston |
| 6,428,013 B1 | 8/2002 | Johnston et al. |
| 6,481,896 B1 | 11/2002 | Ohtsuki et al. |
| 6,513,810 B1 | 2/2003 | Pataille |
| 6,513,812 B1 | 2/2003 | Yang et al. |
| 6,520,507 B2 | 2/2003 | Pataille et al. |
| 6,601,855 B1 | 8/2003 | Clark |
| 6,688,603 B2 | 2/2004 | vom Schemm |
| 6,702,293 B2 | 3/2004 | Endo et al. |
| 6,860,486 B2 | 3/2005 | Hacker et al. |
| 6,921,080 B2 | 7/2005 | Johnen |
| 6,921,082 B2 | 7/2005 | Lutaud |
| 6,945,537 B2 | 9/2005 | Guillerme et al. |
| 7,004,471 B2 | 2/2006 | Bryde et al. |
| 7,134,669 B2 | 11/2006 | Uhrner |
| 7,172,201 B2 | 2/2007 | Uhrner |
| 7,344,140 B2 | 3/2008 | Ikeda |
| 7,513,690 B2 | 4/2009 | Yamamoto et al. |
| 7,770,897 B2 * | 8/2010 | Berdichevsky ........ F16J 15/322 277/551 |
| 7,854,432 B2 | 12/2010 | Berdichevsky |
| 7,854,433 B2 | 12/2010 | Berdichevsky |
| 8,011,673 B2 | 9/2011 | Berdichevsky |
| 8,066,287 B2 | 11/2011 | Berdichevsky |
| 2002/0117810 A1 | 8/2002 | Schemm |
| 2002/0158421 A1 | 10/2002 | Johnston |
| 2003/0006563 A1 | 1/2003 | Cater et al. |
| 2003/0085527 A1 | 5/2003 | Hacker et al. |
| 2003/0189293 A1 | 10/2003 | Johnen |
| 2003/0230850 A1 | 12/2003 | Bruyere et al. |
| 2003/0230852 A1 | 12/2003 | Bengoa et al. |
| 2003/0230855 A1 | 12/2003 | Malone et al. |
| 2004/0160014 A1 | 8/2004 | Uhrner |
| 2005/0098959 A1 | 5/2005 | Uhrner |
| 2005/0104302 A1 | 5/2005 | Matsui et al. |
| 2005/0140097 A1 | 6/2005 | Kosty et al. |
| 2005/0167429 A1 | 8/2005 | Park et al. |
| 2006/0022414 A1 | 2/2006 | Balsells |
| 2006/0033291 A1 | 2/2006 | Tones et al. |
| 2006/0125192 A1 | 6/2006 | Johnston |
| 2006/0290070 A1 | 12/2006 | Park |
| 2007/0057472 A1 * | 3/2007 | Hatch ............... B29C 45/14614 277/569 |
| 2008/0143055 A1 * | 6/2008 | Dobbs ................. F16J 15/3224 277/595 |
| 2008/0157481 A1 * | 7/2008 | Berdichevsky ........ F16J 15/322 277/402 |
| 2008/0217865 A1 * | 9/2008 | Sedlar ................. F16J 15/3224 277/572 |
| 2010/0244390 A1 * | 9/2010 | Berdichevsky ........ F16J 15/322 277/568 |
| 2011/0241296 A1 * | 10/2011 | Ting ..................... F16J 15/3224 277/568 |

* cited by examiner

ENERGY SAVING SEAL WITH VACUUM INDUCED COUNTER-BALANCE AND ROCKING FEATURE

FIELD

The present disclosure relates to a dynamic shaft seal and more particularly to an energy-saving seal with vacuum induced counter-balancing and rocking feature.

BACKGROUND

This section provides background information related to the present disclosure which is not necessarily prior art.

Currently, lay down lip seals offering low power consumption due to low friction are recommended for use in engines with relatively low levels of crankcase pressure. The seal's radial force is sufficient to keep the lip in contact with a shaft for desired sealing performance yet is low enough to cause minimum friction. However, in certain forced induction engines such as turbocharged and supercharged engines, the crankcase pressure becomes negative and exceeds the capacity of the lay down lip seal to remain in contact with the shaft. This leads to the generation of an air flow from the environment to the crankcase. Interaction of this air flow with the sealing lip, oil and the shaft produces noise/squeal which is unacceptable to customers. Accordingly, it is desirable to provide a low friction seal that maintains seal contact in response to negative pressures on the oil side of the seal.

SUMMARY

This section provides a general summary of the disclosure, and is not a comprehensive disclosure of its full scope or all of its features.

The present disclosure is directed to a seal for sealing between a bore and a shaft for separating an oil side from an air side of the seal. The seal includes an annular mounting portion having a bellows portion extending axially and radially inward from the mounting portion. An axial leg extends axially from the bellows portion toward the air side. A lay down sealing lip extends radially inward and axially toward the oil side from an end of the axial leg. A dust lip extends from the end of the axial leg in a direction opposite the lay down sealing lip. When the system is not under negative pressure, the lay down sealing lip sealingly engages the shaft and the dust lip is radially spaced from the shaft. When the oil side is under negative pressure and when the lay down sealing lip begins to lift radially off the shaft there is a counterbalance force applied to the axial leg through the bellows geometry which maintains the lay down sealing lip in contact with the shaft. In addition, the seal is designed to be flexible enough that the oil side vacuum "rocks" the seal bringing the dust lip into contact with the shaft and blocking airflow. The dust lip is designed to come into contact with the shaft before there is complete sealing lip lift off.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
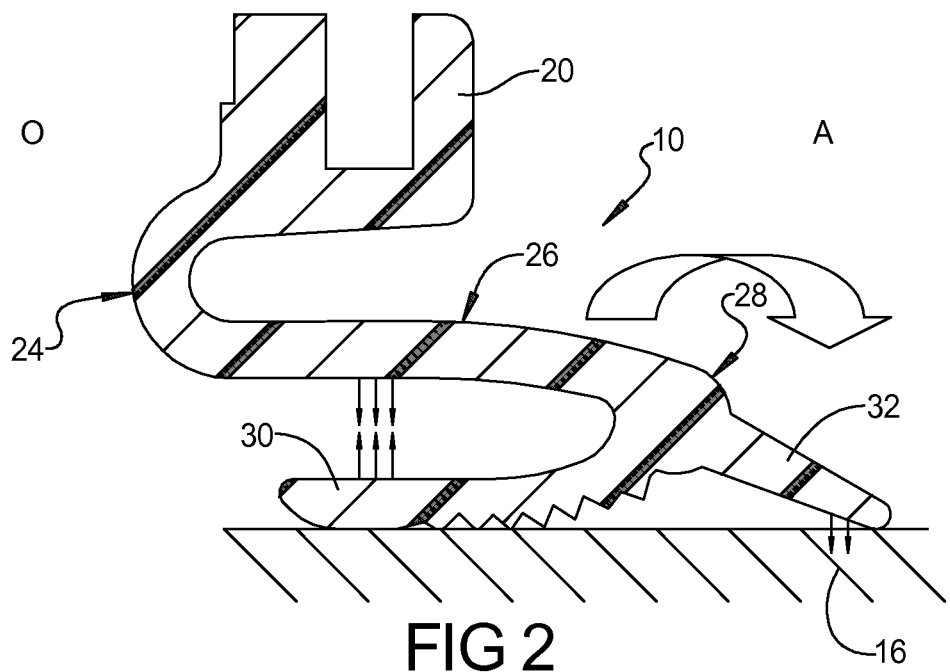

FIG. 1 is a cross-sectional view of the energy-saving seal shown in a normal operating condition according to the principles of the present disclosure; and FIG. 2 is a cross-sectional view of the energy-saving seal of FIG. 1 shown under negative pressure from the oil side.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, the energy saving seal 10 according to the principles of the present disclosure will now be described. The seal 10 is designed for sealing between a bore 12 in an outer member 14 and a shaft 16 and for separating an oil side "O" from an air side "A", as illustrated in FIG. 1. The seal 10 includes an annular mounting portion 20 that can be attached to a metal insert 22 or otherwise engaged with the bore 12 of the outer member 14. The annular mounting portion 20 and optional metal insert 22 can each take on many forms and the exemplary mounting portion 20 and a metal insert 22 as shown, are merely shown for illustrative purposes.

A bellows portion 24 extends axially and radially inward from the mounting portion 22. The bellows portion 24 extends axially and radially so that the bellows portion 24 can flex radially inwardly. An axial leg portion 26 extends axially from the bellows portion 24 toward the air side A. The axial leg 26 terminates at a pivot portion 28 from which a lay down sealing lip 30 extends radially inward and axially toward the oil side O. A dust lip 32 extends radially inward and axially from the pivot portion 28 in a direction opposite the lay down sealing lip 30 toward the air side A. The pivot portion 28 may define a region of increased thickness relative to the axial leg portion 26, the lay down sealing lip 30 and the dust lip 32 to define a region that pivots relative to the axial leg portion 26 rather than being easily deformed.

The lay down sealing lip 30 can include pumping grooves 34 on an inner surface thereof. Under operating conditions with little or no negative pressure on the oil side, the lay down sealing lip 30 engages the shaft 16 while the dust lip 32 is spaced from the shaft 16, as shown in FIG. 1. The lay down sealing lip 30 is engaged with and provides little friction against the shaft 16. Under operating conditions with negative pressure on the oil side O, the negative pressure tends to cause the lay down sealing lip 30 to lift off of the shaft 16, there is a counterbalance force that is applied to the axial leg 26 through the bellows geometry 24, which maintains the lay down sealing lip 30 in contact with the shaft 16. In addition, the seal is designed to allow the whole seal to rock about the pivot portion 28, as illustrated by the arrow in FIG. 2, when vacuum is applied, bringing the dust lip 32 into contact with the shaft 16 and to prevent airflow from developing past the seal 10.

The seal material composition can include plastic, rubber, or any of a wide variety of known elastomers, such as PTFE, and TPE (thermoplastic elastomers) and TPV (thermoplastic volcanizates).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A seal for sealing between a bore and a shaft for separating an oil side from an air side of the seal, comprising:
   a mounting portion;
   a bellows having a first portion extending axially from the mounting portion in a first axial direction toward the oil side and the first portion extending radially inward from the mounting portion and the bellows having a second portion extending axially from the first portion toward the air side and the second portion extending radially inward from the first portion;
   an axial leg extending axially from the bellows portion in a second direction opposite to the first direction toward the air side, the axial leg extending from the second portion at a location on a first axial side of the mounting portion, a terminal end of the axial leg is connected to a pivot portion defined by a region of increased thickness relative to a thickness of the axial leg, the pivot portion being disposed at a location on a second axial side of the mounting portion opposite from the first axial side;
   a lay down sealing lip extending radially inward and axially in the first direction toward the oil side from the pivot portion; and
   a dust lip extending from the pivot portion at the end of the axial leg in the second direction opposite the lay down sealing lip, wherein the region of increased thickness defining the pivot portion has an increased thickness relative to a thickness of both the dust lip and the lay down sealing lip and the pivot portion is disposed axially between the lay down sealing lip and the dust lip, wherein during operation without negative pressure on the oil side, the lay down sealing lip is engaged with the shaft and the dust lip is radially spaced from the shaft and when said oil side is under negative pressure that tends to cause the lay down sealing lip to begin to lift away from the shaft, the end of the axial leg flexes to engage the dust lip with the shaft.

2. The seal according to claim 1, wherein said lay down sealing lip includes grooves therein.

* * * * *